April 12, 1927.

P. MacGAHAN 1,624,417

METER CASING

Filed Jan. 26, 1922

WITNESSES:
A. J. Schiefelbein
W. B. Jaspert.

INVENTOR
Paul MacGahan.
BY
Wesley G. Carr
ATTORNEY

Patented Apr. 12, 1927.

1,624,417

UNITED STATES PATENT OFFICE.

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

METER CASING.

Application filed January 26, 1922. Serial No. 532,056.

My invention relates to electric meter casings and it has for one of its objects to provide a portable-meter casing which shall be of simple, economical construction and which may be readily manufactured in large quantities.

A further object of my invention is to provide a meter casing which shall be strong, durable and wear-resistant and which shall not be attacked by oil, grease or other destructive agents.

In the manufacture of electrical measuring instruments, it has been customary to employ wooden casings or boxes in which the mechanisms of the instruments were mounted. It has also been a usual practice to provide a molded top or cover containing a glass face in alignment with the dial of the instrument.

Although this type of housing was serviceable, it was subject to change of shape, owing to moisture and atmospheric conditions which often resulted in affecting the accuracy of the instrument.

According to my present invention, I utilize a base, housing and top of molded materials having a fibrous base and a suitable binder, such as a phenolic condensation product consolidated under heat and pressure. The base and top may be formed independently of the wall members or housing and be attached to the latter by suitable screws or bolts.

In the accompanying drawings constituting a part hereof, and in which like reference characters designate like parts, Figure 1 is a top plan view, partially in section, of a meter casing formed in accordance with this invention;

Figure 1:
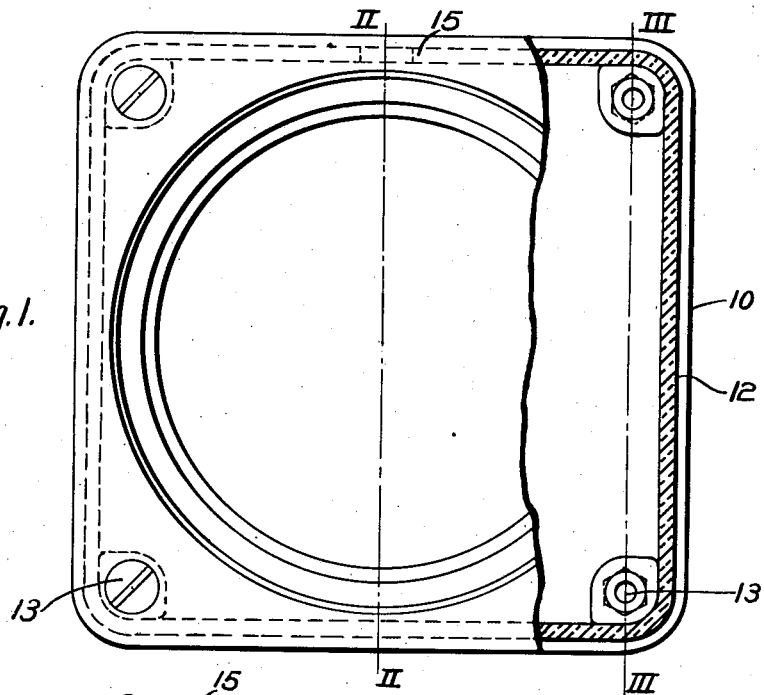
Figure 2:
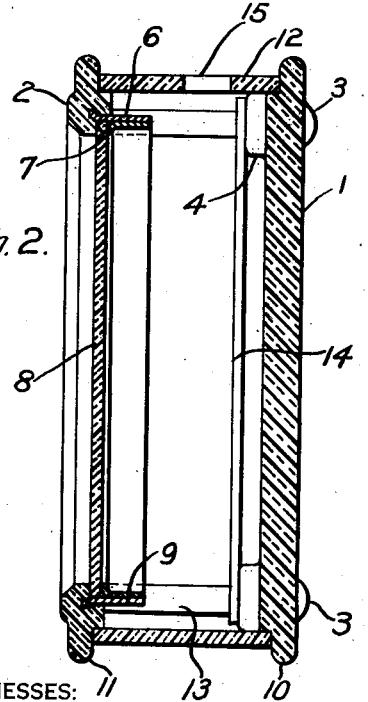
Fig. 2 is a cross-sectional view taken along the lines II—II of Fig. 1.
Figure 3:
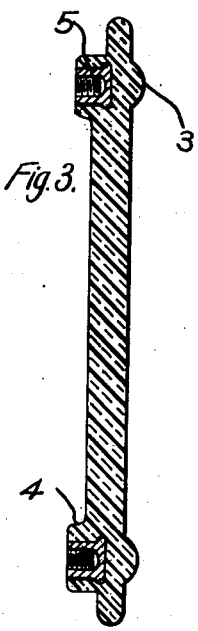
Fig. 3 is a cross-sectional view of the base member taken along the lines III—III of Fig. 1.

The base 1 and top or cover 2 (Fig. 2) are formed of a suitable molding composition, such as shredded fibrous material, containing a resinous binder, preferably a phenolic condensation product, by providing a suitable mold of the shape and contour of the finished part, depositing the molding mixture therein, and molding it in the usual manner under heat and pressure. The base 1 has a plurality of projecting lugs 3 and mounting bosses 4 molded integrally therewith and is further provided with a plurality of flanged screw nuts 5 which are molded centrally within the bosses 4. The cover 2 is provided with an annular flanged sheet-metal rim 6, which is molded integrally therewith, to provide a seating flange 7 for mounting a glass plate 8, which is secured in position by pressing an annular flanged sheet-metal rim 9 into the rim 6.

The base 1 and the top 2 are provided with circumferential flanges 10 and 11, respectively, for seating the housing 12 which is formed of a plurality of spirally wound superposed layers of fibrous sheet material and consolidated with a heat-hardened resinous binder. The housing 12 is formed by winding a continuous strip of fibrous sheet material, such as paper, fabric and the like, impregnated or coated with a binder, preferably a phenolic condensation product, around a rectangular-shaped heated mandrel having pressure rolls acting thereon. The heat and pressure consolidates the layers forming a dense, hardened structure which is cut into suitable lengths corresponding to the width of the housing. This provides an economical and inexpensive structure.

The housing 12 is inserted between the base member 1 and the top 2, and the assembled structure is secured by a plurality of screws 13 which are threaded into the nuts 5. The screws 13 also secure a metal or fibrous plate 14 which serves as a means for mounting the instrument upon the seating lugs 4. Suitable openings 15 may be provided in the housing for the terminal leads of the meter.

It will be readily understood from the above description of my invention that meter casings formed in accordance therewith provide a simple, economical structure which may be readily manufactured in production quantities with uniform accuracy. The operation of molding the base and cover and the forming of the housing may be controlled to within a few thousandths of an inch, and the screw mountings or nuts 5 are accurately disposed in the mold by mechanical spacers, thereby guarding against any inaccuracy and avoiding the necessity of machining. A meter casing of this design and construction is compact, durable and relatively inexpensive and affords ample protection for the instrument because of its accurate fittings and joints. The meter functions more accurately, owing to the absence of large metal masses in the casing.

Although I have described a specific embodiment of my invention, it will be obvious to those skilled in the art that various modifications may be made in the details of construction thereof without departing from the principles herein set forth. For instance, the base and the cover may be of any suitable shape and may be provided with suitable grooves for seating the housing in place of the projecting flanges 10 and 11. The bosses and seating lugs may be of any suitable shape, and various methods of mounting the glass to the cover may be employed in place of the sheet-metal rims. The housing base and cover may be of annular instead of rectangular shape.

I claim as my invention:

1. A meter casing comprising a molded insulating wall member having adjacent integral inner boss and outer lug portions for reinforcing each other and for supporting, respectively, an element opposite the inner side of said wall and the casing on an exterior support, and a metal anchor member embedded in the insulation between said lug and boss for co-operation with said element.

2. A meter casing comprising a front window-cover member, a molded insulating rear wall member having adjacent integral inner boss and outer lug portions for reinforcing each other and for supporting, respectively, cover-holding members inside the casing and the casing on an exterior support, cover-holding members extending between the cover and said bosses, and a meter-mechanism-supporting plate mounted on said cover-holding members and spaced from said rear wall by said bosses.

3. A meter casing comprising a molded insulating cover member having a window opening and a metal pane-supporting rim member having a perimetral portion greater in diameter than said opening embedded in said cover member to provide an insulating shoulder for the pane.

4. A meter casing comprising a molded insulating cover member having a window opening and a metal pane-supporting rim member of greater diameter than said opening disposed around the opening and having a laterally-extending anchor portion embedded in the cover member.

5. A meter casing comprising a molded insulating cover member having a window opening and a rabbet groove around the perimeter of the opening to provide a shoulder, and a sheet-material tubular rim fitting the groove and having a portion of its perimeter embedded in the material of the cover member.

6. A meter casing comprising a molded base member and a plurality of metal anchor members embedded therein, a side-wall member of fibrous sheet material and a binder, a molded cover member having a window opening therein, a pane-supporting metal rim member having a portion embedded in the cover member around said window opening, and means co-operating between said anchor members and said cover member outside said rim to hold said members together.

7. A meter casing comprising oppositely-spaced molded insulating base and cover members having rabbet grooves adjacent, and substantially conforming to, the outer perimeters thereof, a side wall member of sheet material fitting said grooves, a plurality of metal anchor nuts embedded in said base member and distributed about the outer portions thereof inside said side-wall member, and a plurality of screw-bolts extending through the cover member and casing to said anchor nuts.

8. A meter casing comprising a tubular side-wall member, insulating base and cover members therefor having grooves substantially conforming to the ends thereof, a plurality of metal anchor members embedded in said base member inside said side-wall member, and a plurality of holding members co-operating between said cover member and said anchor members.

In testimony whereof, I have hereunto subscribed my name this 24th day of January, 1922.

PAUL MacGAHAN.